G. A. WING.
Plow.
No. 86,615. Patented Feb. 2, 1869.
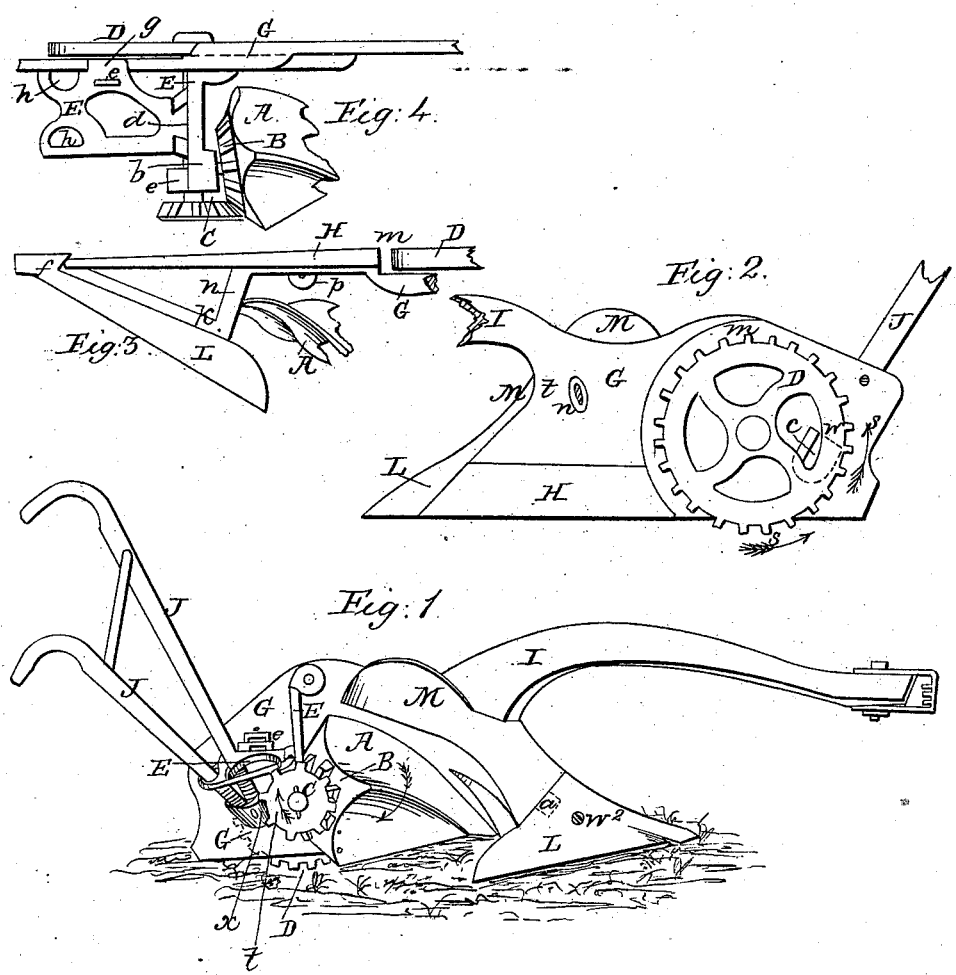
Witnesses:
R. B. Wing
Thos. Houghton
Inventor.
George A. Wing

GEORGE A. WING, OF ALBANY, NEW YORK.

*Letters Patent No. 86,615, dated February 2, 1869.*

IMPROVEMENT IN PLOWS.

The Schedule referred to in these Letters Patent and making part of the same.

*To all whom it may concern:*

Be it known that I, GEORGE A. WING, of the city of Albany, county of Albany, and State of New York, have invented certain new and useful Improvements in Plows; and I do hereby declare that the following is a full, clear, and exact description thereof, reference being had to the accompanying drawings, forming part of this specification, and to the letters of reference marked thereon, in which—

Figure 1 is a perspective view of my invention.

Figure 2 is an elevation of the landside of the plow.

Figure 3 is a bottom view of the front end of the plow.

Figure 4 is a top view of the back end of the plow.

Similar letters of reference indicate like parts in all the figures.

To enable others skilled in the art to make and use my invention, I will proceed to describe its construction and mode of operation.

A designates a conical roller, constructed with deep spiral flutes or concavities, extending its entire length, and having a pitch of about one-quarter of the circumference of the roller.

At the small or pointed end of said roller A is a pivot or journal, $n$, as shown in fig. 3, and at its largest end is a journal or pivot, $b$, as seen in fig. 4. Said conical roller, A, has also bevel-teeth on its upper or largest end, as shown in figs. 1 and 4.

The spiral flutes and pivots $n$ and $b$, and bevel-teeth B, are cast at one and the same time, making the construction of the conical roller A easy to accomplish.

On the landside of the plow I place a spur-wheel, D, or its equivalent, which projects a little below the land-rest H, as shown in figs. 1 and 2.

The landside is recessed where the driving-wheel D runs, as shown in figs. 2, 3, and 4.

The driving-shaft, which operates the bevel-wheel C, is supported by a bracket, F, which is bolted to the landside G, as shown in figs. 1 and 4.

Near the end of bracket E, I cast projections for the support of the large end of conical roller A, and the driving-shaft, which connects the driving-wheel D to the bevel-wheel C, as shown in fig. 4.

On one side of bracket E, I cast a dovetailed recess, as shown in fig. 4, into which a corresponding projection, $d$, on one end of brace F, is fitted.

Brace F is so constructed as to pass through a hole in the side of the plow, and is then wedged tight in its place, as shown at $e$ in fig. 1, the dovetail $d$, at its front end, having been previously inserted into its place on bracket E, as shown in fig. 4.

At the back end of brace F are two apertures, $h\ h$, through which the handles J J of the plow pass.

The handles J J meet at their lower ends in a pouch, G, and are secured together by a pin, $x$, which passes through them, and also secures them in place. They are further secured by pin $w$, shown in fig. 2.

Immediately under the plow-share L is a triangular projection from the landside of the plow, to which the share L is secured by screws $w^2$, the end of the share being fitted, at its point, to pass over the ends of the land-rest H and projection K, as shown in fig. 3.

The land-rest is secured in place by first inserting its forward end under the rebate $f$ of the share L, and then by inserting a pin through a nib projecting from it through the landside, as shown at $p$ in fig. 3.

The mould-board M has a nib cast on its lower end, which fits into a corresponding recess under the share L, as shown at $a$ in fig. 1.

The mould-board M is further held in place by a pin cast near its upper part, and projecting in an oblique direction through the landside, as shown at $t\ n$ in fig. 2.

It will be seen, from the above description, that every part of this plow has been designed so as to be easily cast and readily put together, not requiring the services of a skilled mechanic for this purpose.

It will also be seen, that when the plow is pulled forward, the driving-wheel D will be caused to revolve, and by means of bevel-wheels C and B, motion will be transmitted to the spirally-fluted conical roller A, and as the furrow is thrown up by the plowshare L, it will be turned over and thoroughly broken by the spiral flutings in the conical roller A.

It is plainly to be seen that the spiral flutings in the conical roller A will cause it to break up the furrow freely, and much easier than if they were made straight.

Having thus described my invention, its construction, and mode of operation,

What I claim as new, and desire to secure by Letters Patent, is—

1. The driving-wheel D, bracket E, brace F, bevel-wheels C and B, in combination with conical spirally-fluted roller A, plowshare L, and mould-board M, all constructed and arranged substantially as and for the purpose herein set forth.

2. The mode of supporting brace F by dovetail support $d$ on bracket E, and wedge $e$ on the landside G, substantially as shown and described.

GEORGE A. WING.

Witnesses:
    R. B. WING,
    THOS. HOUGHTON.